United States Patent [19]
Tall

[11] 3,781,130
[45] Dec. 25, 1973

[54] TURBINE BLADE MANUFACTURED OF SELF-CARRYING LAMINATES

[75] Inventor: Wayne A. Tall, Dayton, Ohio

[73] Assignee: The United States of America as represented by the Secretary of the Air Force, Washington, D.C.

[22] Filed: June 27, 1972

[21] Appl. No.: 266,810

[52] U.S. Cl. ................................ 416/97, 416/229
[51] Int. Cl. ............................................. F01d 5/08
[58] Field of Search .................... 416/229, 231, 96, 416/97, 95; 29/156.8 B, 156.8 H

[56] References Cited
UNITED STATES PATENTS

| 2,618,462 | 11/1952 | Kane | 416/229 X |
| 2,801,792 | 8/1957 | Lindhagen et al. | 416/229 X |
| 2,843,355 | 7/1958 | Findley | 416/229 X |
| 2,853,271 | 9/1958 | Findley | 416/229 X |
| 2,857,657 | 10/1958 | Wheeler | 29/156.8 |
| 3,074,151 | 1/1963 | Kroeckel | 29/156.8 |
| 3,368,795 | 2/1968 | Bolin et al. | 416/229 |
| 3,515,499 | 6/1970 | Beer et al. | 416/95 |

Primary Examiner—Everette A. Powell, Jr.
Attorney—Harry M. Herbert, Jr. et al.

[57] ABSTRACT

A turbine blade manufactured from a series of laminates each oriented in a radial-tangential plane for carrying its own centrifugal loads, and partially preformed by being initially cut into a shape suitable for stacking and bonding and being further perforated along boundaries outlining the final blade shape desired for facilitating the machine removal of excess material therefrom. Additional perforations are also incorporated in each laminate for outlining a series of built-in coolant passages.

4 Claims, 3 Drawing Figures

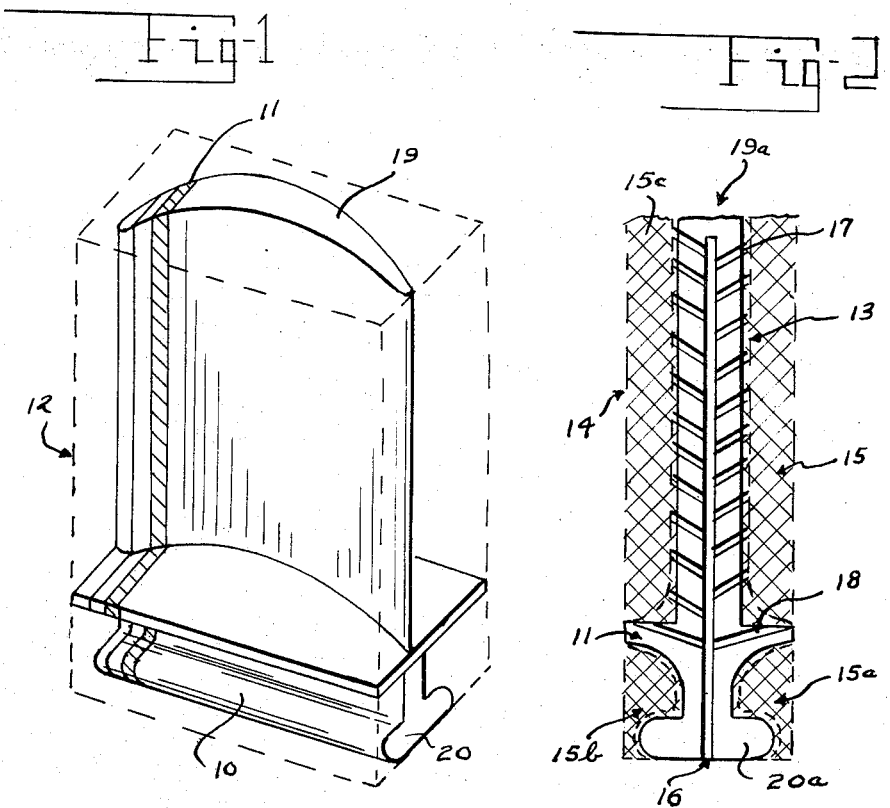
Fig-1
Fig-2
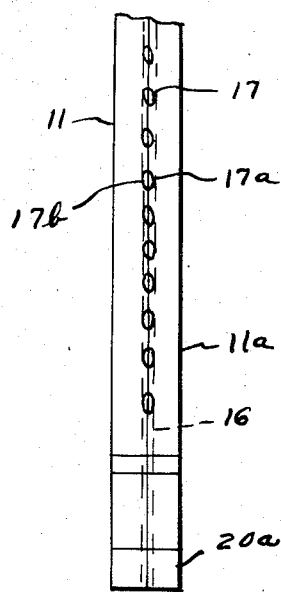
Fig-3

TURBINE BLADE MANUFACTURED OF SELF-CARRYING LAMINATES

BACKGROUND OF THE INVENTION

This invention relates generally to the fabrication of turbine blades and, in particular, to a laminated form of blade structure that facilitates the incorporation of relatively complex internal fluid cooling passages therewithin.

The unique laminated turbine blade of the present invention is the result of the recognition of the existence of certain built-in disadvantages involved in the manufacture of turbine blades by other prevalent techniques that include, but are not necessarily limited to, machining problems for forged blade structures, difficulties in accuracy and reproductability for cored, cast designs, and that of bonding and material strength problems for laminated designs in general. These problems are intensified especially when the blade structure is to incorporate provisions for fluid cooling. As will appear self-evident hereinafter in the following summary and detailed description thereof, the new and improvded laminated blade of the present invention solves or, at least, greatly alleviates the aforementioned difficulties of other methods by a novel and yet simplified means to be further described.

SUMMARY OF THE INVENTION

This invention consists briefly in a turbine blade constructed from a series of laminates which are each initially cut into a shape that is suitable for stacking and bonding together into a preliminary blade structure of the desired overall size and shape for a particular turbine application. However, before the said stacking and bonding takes place, each of the initially cut laminates is previously and uniquely marked with perforations that outline the final shape of the blade being constructed and, in this novel manner, the subsequent removal of the excess material therefrom to achieve the final blade form is greatly facilitated. Thus, by initially cutting each laminate into a shape suitable for stacking and bonding, and then perforating the laminate preliminary to its stacking and bonding, a partially preformed laminate is produced that greatly aids in both the aforementioned bonding and in the final machining of the blade.

Another unique characteristic of the present blade resides in the specific orientation of each of the several turbine blade-laminates in a radial-tangential plane, when assembled to the turbine-rotating disk element, which radial-tangential orientation positively provides for and ensures that each of the said laminates carries or, in other words, supports its own, pro-rata share of the centrifugal loads acting upon the blade structure during its operation. Thus, a new and novel, and yet simplified, built-in means has been inherently provided in the inventive blade structure for greatly increasing its material strength at a relatively reduced weight.

Other objects and advantages inherent in this invention will become readily apparent hereinbelow in connection with the following disclosure, taken with the accompanying drawings, in which;

BRIEF DESCRIPTION OF THE DRAWINGS

FIG. 1 is an overall schematic and perspective view, partly cross-hatched to indicate the disposition of the individual laminates comprising the new and improved turbine blade of the present invention, and further showing the outline of the preliminary perforated shape of the blade;

FIG. 2 is a second, partly schematic and plan view of one of the laminates of the inventive blade of FIG. 1; and FIG. 3 represents a third, partly schematic and edge view, illustrating two of the laminates of the inventive blade of FIG. 1 bonded together and depicting one cooling hole or passage design which could be easily utilizable therewith.

DESCRIPTION OF THE PREFERRED EMBODIMENT

Referring generally to the drawings and, in particular, to FIG. 1 thereof, the new and improved turbine blade of the present invention, which is indicated in its substantially final form at 10, may be constructed, in a novel manner, from and be composed of a plurality of laminates, one of which being depicted in cross-hatched form at 11, which laminates 11 are uniquely partially preformed to thereby facilitate the fabrication and machining of the turbine blade 10 into its final shape. This partial preforming is accomplished, in part, by initially cutting each of said laminates 11 into a shape that is particularly suitable for stacking and bonding together to thereby form a box-like structure, the outline of which being indicated generally at 12 in the aforementioned FIG. 1 and which represents the preliminary perforated shape of the turbine blade 10 prior to its machining into its final shape. In the example presented herein the shape into which each laminate 11 is to be, and has been cut is illustrated as being rectangular; however, any shape that satisfies the aforementioned requirement may be just as easily used and, as such, clearly falls within the scope of protection of the present invention. The initial box-like structure 12 thus formed allows and positively ensures that an even pressure is applied to each laminate during the bonding process.

After having been initially cut, in this instance, into a rectangular shape and therefore being especially suitable for the aforementioned stacking and bonding, each laminate, as at 11, may be uniquely and further partially preformed by being perforated through the use of any well-known and already-available chemical, electrical, mechanical, or combination perforating apparatus, including the use of a Laser, along the boundaries outlined by the dashed lines at 13 in the view of a single laminate in FIG. 2. With the novel use of the perforations 13, which represents the approximate final shape of the turbine blade 10, there is greatly facilitated the machine removal of the gross or excess material formed by the several cross-hatched areas, indicated at 15, 15a, 15b and 15c and which are encompassed within the outline 14 of the preliminary perforated shape of the laminate 11.

To complete the new and improved partial preforming of the inventive turbine blade 10 and, in particular, each of the laminates 11 thereof, after having previously accomplished the main perforation of each of the said laminates 11 to thereby form the approximate outline, as at 13, of the final blade shape, each laminate 11 is further perforated, while still in its unassembled condition, to thereby provide the outline of, and thus produce a first, series of coolant supply holes or passages, as at 16 (FIG. 2), a second, series of blade surface holes or passages, at 17, and a third, series of blade platform — coolant holes, at 18. After providing the outline of each of the holes or passages 16, 17 and 18, through use of the inventive perforation technique, and prior to the stacking and bonding of the laminates 11, the machine removal of the excess material is accomplished in a relatively easy manner by cutting along the perforations previously marked in each laminate 11 of the turbine blade and outlining the respective cooling passages. It is noted that the cooling passages 17 and 18 extend partly into the cross-hatched areas 15 and 15c to the perforated outline, at 13, which represents the perforated boundary along which the initial machine cutting away of the gross material occurs.

After forming the above-mentioned cooling holes or passages 16, 17 and 18, which step is quite facilitated through use of the perforated outline incorporated within each laminate 11, the plurality of said laminates are then stacked and bonded together into the previously-described box-like structure at 12 (FIG. 1), which, as noted hereinbefore, represents the outline of the preliminary and now-perforated shape of the turbine blade 10. Then, through the use of any appropriate machining apparatus, the gross material incorporated within the previously-noted cross-hatched areas 15, 15a, 15b and 15c may thereafter be removed with dispatch by completely cutting along the perforations 13 outlining the final shape. The desired precise shape of the entire turbine blade 10 may next be completed by the utilization of a finish or final contour machining step and/or grinding operation, as desired.

With particular reference to FIG. 3, an adjacently positioned pair of the inventive laminates are indicated respectively at 11 and 11a as being bonded together and illustrating a specific cooling hole or passage design that would be easily utilized with, and be formed by the present invention. Of course, the said cooling holes or passages represent the previously described blade surface coolant holes or passages 17 of FIG. 2. Thus, in FIG. 3, it is clearly seen that, in actual practice, the inventive perforating technique of the improvement of the present invention would be used to form matching pairs of hemispherical passages, indicated, for example, respectively at 17a and 17b, which when mated together by the bonding of the adjacently positioned laminates would naturally form a completed and closed hole or passage. The coolant supply hole or passage is again indicated at 16 in the aforementioned FIG. 3. However, as an alternative technique, each laminate, as at 11, could be impressed, machined, or etched entirely on one side thereof, so that a complete series of coolant fluid holes or passages could be incorporated therewithin.

An additional unique characteristic of the structure of the present turbine blade 10 resides in the specific orientation of the previously described bonded and partially preformed laminates, as at 11, in a radial-tangential plane, when assemblied to the rotating disk member (not shown) of a particular turbine. In this connection, the said laminates 11 are each formed with interconnected, integral airfoil and dovetail portions, at 19a and 20a, which collectively form the blade-airfoil and dovetail, as is indicated respectively at 19 and 20 (see FIG. 1), which integral airfoil and dovetail portions 19a, 20a particularly when taken in conjunction with the radial-tangential orientation thereof, ensures that each laminate, as at 11, is self-carrying or self-supporting in that it supports itself and thereby carries its own centrifugal loads through the dovetail 20 into the turbine-rotating disk member with which it is adapted to be assembled. Therefore, bond strength is needed only for bending shear loads, and internal pressure loads from the fluid cooling means, provided the internal coolant pressure is not large by comparison with the pressure over the blade.

Thus, a new and improved turbine blade structure has been developed by the present invention that is both inherently stronger by being constructed of a series of radially oriented and bonded laminates, and is more quickly fabricated, as compared to casting and drilling processes, by having each laminate perforated along boundaries outlining both the final blade shape and a series of cooling passages to be incorporated therein for thereby providing for the relatively inexpensive machine removal of excess material therefrom.

I claim:

1. In a method for facilitating both the production of a turbine blade of increased strength, greatly simplified construction, and relatively reduced weight, and further specifically and positively providing for and having built-in provisions for fluid cooling, the steps comprising; initially cutting each of a plurality of individual laminates into an overall rectangular or other specific shape most suitable both for stacking and for ensuring, and providing for the application of a more uniform and positive bonding pressure between adjacently-positioned laminates in the completed stack; facilitating the subsequent final and complete fabrication of the turbine blade by initially, and partially and separately preforming each of the said individual and precut laminates, before their stacking and bonding together, by impressing therewithin both the approximate and general overall outline of the final blade shape to be produced, and complementary matching half portions, with respect to the adjacently positioned laminates in a completed stack, of each of a plurality of built-in coolant passages of varying disposition and complexity to be inherently incorporated in the final blade structure prior to, and as a result of the final assembly thereof; then removing excess material by machine cutting along the previously impressed outlines of, and thereby completing the initial preliminary production of the said complementary matching half portions in preparation for the subsequent formation of the said built-in coolant passages during the final fabrication of the turbine blade; thereafter partially fabricating the turbine blade and completing the formation of the said built-in coolant passages by stacking and bonding together said plurality of individual and now-partially preformed laminates into an overall laminated box-like structure approximating the overall size and shape, and containing the previously impressed outlines in each of the said laminates of the turbine blade to be produced therefrom; and, finally, completing the fabrication of the turbine blade, first, by initially machine removing the gross material from the said box-like structure by cutting along and completely through the said previously-impressed outlines of the approximate final blade shape initially formed in each of the said individual and now-aligned laminates during the partial preformation of each thereof to thereby achieve the rough blade form in final preparation for its subsequent finish contour machining and/or grinding operations.

2. In a method for producing a turbine blade as in claim 1, wherein the step of facilitating fabrication of the turbine blade comprises perforating each laminate along outlines of both the final blade shape and the built-in coolant passages.

3. In a method for producing a turbine blade as in claim 2, wherein the step of perforating each laminate during the partial preforming thereof to thereby facilitate fabrication of the turbine blade includes the outline and thereby the preparation of the provision of a turbine blade structure having an airfoil portion, and a dovetail portion to be integrally formed with the airfoil portion and being further adapted for attachment with a turbine-rotating disk member.

4. In a method for producing a turbine blade as in claim 3, wherein the step of partially fabricating the turbine blade includes stacking and bonding together of the plurality of laminates with their orientation being in a radial-tangential plane for thereby positively ensuring that each laminate supports its own centrifugal loads through the integral dovetail portion into the rotating disk member of the turbine and thus provides an inherently stronger laminated turbine blade structure.

* * * * *